United States Patent [19]

Carberry et al.

[11] Patent Number: 5,956,443

[45] Date of Patent: Sep. 21, 1999

[54] SEALED AIRLINES IN OPTICAL FIBER COUPLERS

[75] Inventors: Joel P. Carberry, Horseheads; William J. Miller; David L. Weidman, both of Corning, all of N.Y.

[73] Assignee: Corning Incorporated, Corning, N.Y.

[21] Appl. No.: 08/992,396

[22] Filed: Dec. 17, 1997

Related U.S. Application Data

[60] Provisional application No. 60/036,830, Jan. 31, 1997.

[51] Int. Cl.$^6$ ...................................................... G02B 6/26
[52] U.S. Cl. .............................................. 385/43; 65/385
[58] Field of Search ............................... 385/43, 55, 137, 385/123, 96, 24, 115; 65/420, 144, 428, 385

[56] References Cited

U.S. PATENT DOCUMENTS

| | | | |
|---|---|---|---|
| 4,328,018 | 5/1982 | Siegfried | 65/420 |
| 4,475,790 | 10/1984 | Little | 385/137 |
| 4,906,068 | 3/1990 | Olson | 385/43 |
| 4,915,467 | 4/1990 | Berkey | 385/43 |
| 5,190,364 | 3/1993 | Imoto et al. | 385/92 |
| 5,412,748 | 5/1995 | Furuyama et al. | 385/92 |

*Primary Examiner*—Akm E. Ullah
*Attorney, Agent, or Firm*—William J. Chervenak

[57] ABSTRACT

A waveguide fiber coupler including a tubular element surrounding the coupling region wherein sealed elongated open regions are formed between the fused waveguide surfaces which form a part of the coupler and the tubular element. The coupler exhibits improved properties due to the presence of the elongated open regions. The sealing of the elongated open regions provides for improved environmental stability of the coupler.

17 Claims, 5 Drawing Sheets

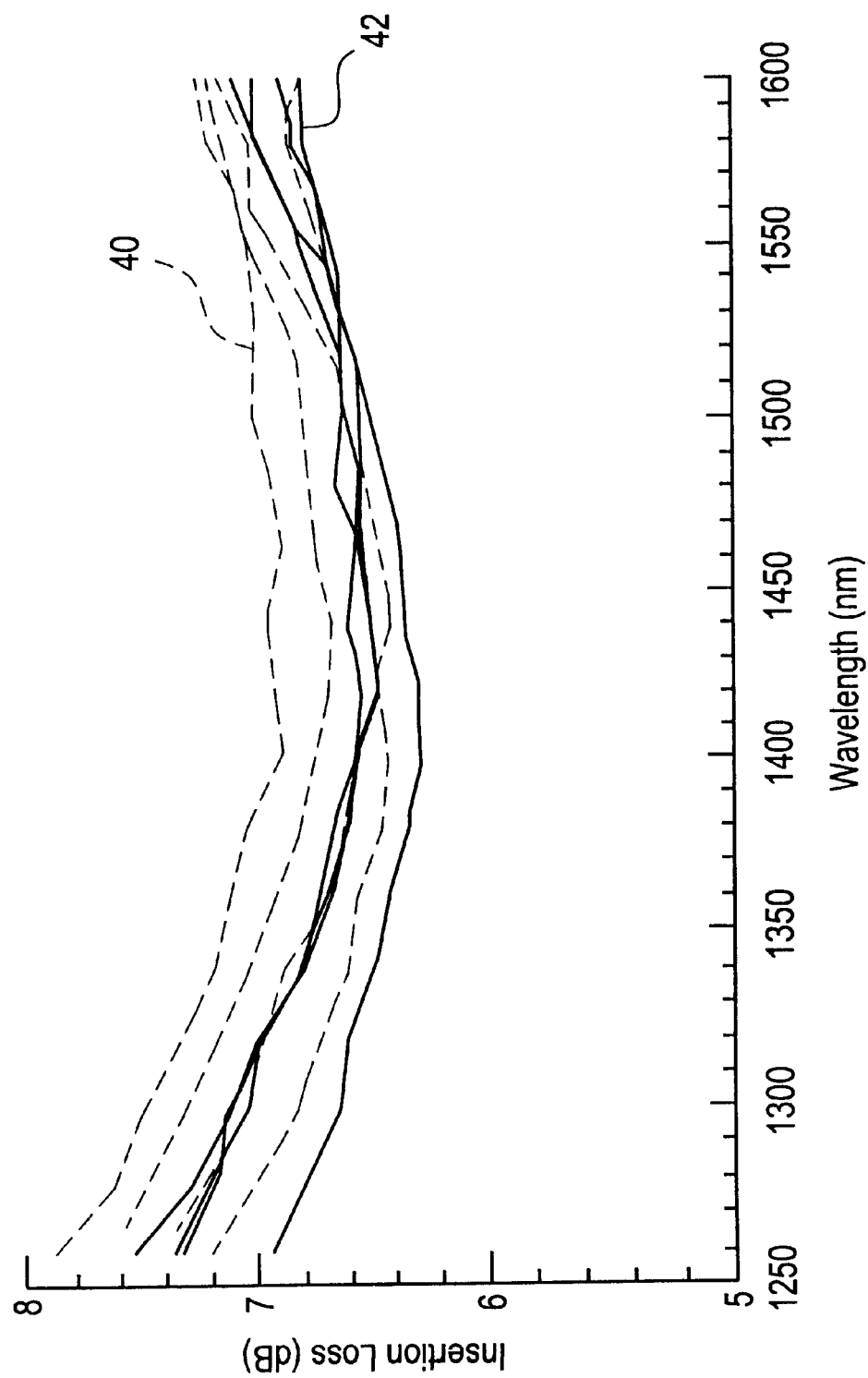

SEALED AIRLINES IN OPTICAL FIBER COUPLERS

This a regular application based on provisional application Ser. No. 60/036,830 filed Jan. 31, 1997.

BACKGROUND OF THE INVENTION

The invention relates to improvement in reliability of optical waveguide fiber couplers. More particularly, the invention relates to an optical waveguide fiber coupler having sealed airlines and a method of sealing the airlines.

It is known in the art that light may pass back and forth between optical waveguide fibers when the light carrying portions of the waveguides are maintained close to one another. An optical waveguide coupler which exhibits excellent optical and physical properties is made from a starting assembly which includes two or more waveguides having an uncoated portion of their length surrounded by a glass tube. One such coupler is the Corning Inc., MultiClad™ coupler which derives its name from this surrounding glass tube which in some ways serves as an extra clad layer. The glass tube and the enclosed waveguides are heated to a selected softening temperature and the assembly is stretched, thereby reducing the thickness of the waveguide fiber clad glass layer and thus bringing the light carrying portions of the waveguides into coupling proximity. The glass tube serves to strengthen the coupler, to better confine the light passing through the coupler, as well as to affect optical properties of the coupler.

Important functional properties of the coupler are:

insertion loss, which compares the power in one output fiber to the power in one input fiber;

the excess loss, which compares the total output power to the total input power;

the dependence of insertion loss and excess loss on wavelength, where the objective often is achromatic coupler performance;

the splitting ratio among the outputs; and, the stability of the coupler in typical environments.

Recent work in the coupler art has shown that the presence of so called "airlines", i.e., elongated open regions along the coupler length, bounded by the inner surface of the tube and the clad layer of the waveguides surrounded by the tube, improves coupler performance with respect to control of maximum excess loss over a band of wavelengths. The airlines also reduce the wavelength dependence of insertion loss, i.e., the airlines improve the achromaticity of the coupler. However, the performance of couplers so constructed was found to degrade in certain environments, particularly those in which the coupler was exposed to hot, humid conditions. The couplers having airlines were found to be more susceptible to degradation than those which were essentially completely fused, i.e., free of airlines.

Thus it is an objective of the invention to retain the benefits of having airlines in the coupler and eliminate the environmental sensitivity of the couplers.

SUMMARY OF THE INVENTION

The novel optical waveguide coupler provides the enhanced performance provided by presence of elongated open regions (airlines) while maintaining the integrity and stability of the coupler in a range of severe environments. The environments include those having wide ranges of temperature or humidity, or those which contain contaminating fluids which may degrade coupler performance by entering the airlines.

A first aspect of the invention is an optical waveguide coupler which includes at least two optical waveguide fibers threaded through a tubular element (tube). The coupling region comprises a portion of the coupler where the waveguide fibers are fused to each other and their lateral dimension reduced. In a preferred embodiment the fibers are also fused to the tube and the lateral dimension of both the fibers and tube have been reduced, for example by heating and stretching. The coupling region is a substantially cylindrically shaped length having tapered lengths at either end of the cylindrically shaped length. The tube surrounds the coupling region and extends past the tapered ends of the coupling region. It has been found that a coupler so constructed exhibits improved performance, in terms of lower excess loss and improved achromaticity, if the fusion among the waveguides is not complete. In one embodiment, the fusion among the waveguides and the surrounding tube is not complete. By not complete is meant there exists elongated open regions (airlines) bounded by the waveguide surfaces and the tube. The airlines of interest are those which extend from an end portion of the tube at least into the tapered region of the coupling region. An airline is sealed at a location in the end of the tube. The seal may be made by fusing the fibers to the tube, by welding the fibers to the tube using an effective material such as a frit or an epoxy or a filled epoxy. If an airline extends from one end of the tube, through the coupling region, and into the opposing end of the tube, the airline is sealed at two locations, i.e, the airline is sealed in each end of the tube.

In the context of this application, a seal is defined as a leak tight fusion, or weld or bond between the waveguide fiber clad layers and the inner surface of the tube. However, the meaning of "leak tight" derives from the performance of the seal in extreme environments, which represent at least the limits of the environments to which the couplers will be exposed in use. That is, the "leak tight" seal is one which is sufficiently free of porousness to at least preserve the coupler properties in the coupler use environment. A preferred seal is one which comprises a fusion among the glass waveguides and the glass tube. It will be understood that, while glass fusion seals or welds or bonds are in general leak tight in terms of the most stringent tests, e.g., a helium leak test, the scope of the invention includes fusion seals which may not be "leak tight" as determined by a particular leak test protocol which differs from the environmental test protocol.

In one embodiment of the novel coupler, the airline extends from a seal in an end portion into the adjoining tapered portion of the coupling region to a point in the tapered region where the draw ratio is $\geq 2$. The coupler may contain more than one airline and an airline can begin in either coupler end portion. The draw ratio is the original radius of the tube divided by the reduced radius at a selected point at which the radius has been reduced by heating and stretching the tube and the waveguide fibers contained therein. At a draw ratio $\geq 2$ the ratio of areas is $A_e/A_{ti} \geq 4$. $A_e$ is the cross sectional area of an end of the waveguide coupler, i.e., the cross sectional area of the tube. $A_{ti}$ is the cross sectional area of the taper at a selected point i along the taper.

In another embodiment of the coupler, an airline extends continuously from a seal in one end of the coupler, through the entire coupling region, to a seal located in the other end of the coupler.

In a preferred embodiment, a seal is spaced apart from the beginning of the nearest tapered portion of the coupling region by at least 5 mm. The tube may be made of a glass which may have a lower index of refraction than the clad layer of the waveguide fiber.

A second aspect of the invention is a method of making the waveguide coupler comprising the steps: threading at least two waveguides through a tube; fusing the waveguide surfaces to each other and to the tube at a location near a first end of the tube to form a seal; performing this same fusing step near the second end of the tube; and heating and stretching the assembly at a location between the seals, to form a coupling region. It will be understood that the seal can be formed by methods other than fusion among the glass surfaces of the waveguides and tube. As is noted above, welds and adhesive bonding are also effective to form a leak tight seal. The one or more elongated open regions (airlines) in the waveguide coupler are formed during the heating and stretching step. The number, cross section, and length of airlines depend upon several variables including:

the number and arrangement of the fibers in the tube;

the glass composition;

the details of the heating means, including the uniformity and intensity of the applied heat;

the stretching speed; and, the finished length of the coupling region.

In an alternative method, the waveguide fibers are held together, by twisting, or by means of any of the several holding fixture known in the art. The fibers are heated and stretched to form the fused coupling region. The coupler is threaded into a tube which covers at least the coupling region and the leak tight seals are made in accordance with the method set forth above.

Any of several methods known in the art may be used to obtain a particular number and type of airlines. Methods of making couplers are described in U.S. Pat. No. 5,078,767, Berkey and U.S. Pat. No. 5,009,692, Miller et al. incorporated herein by reference. A particular subset of the methods described therein will yield couplers having airlines. Essentially any standard process for making the couplers can be adapted to form airlines. A small number of experiments in which the heating and stretching parameters noted above are varied will yield the settings required to form particular numbers and shapes of airlines.

A particular embodiment of the method which provides for the desired number and configuration of airlines is given in Example 1 below. Airlines which extend a certain distance into the coupling region or which extend completely through the coupling region may be made using the embodiment of Example 1.

The particular airlines which have been found to have the greatest impact on the waveguide coupler properties are those which extend through the coupling region and those which extend into the tapered region at least to a point where the draw ratio is $\geq 2$, which is, as noted above, the point at which the ratio of the cross sectional area of a coupler end to the cross sectional area of the tapered region is $\geq 4$.

The distance between the seals and the beginning of the corresponding tapered length is preferably maintained greater than about 5 mm. This spacing of fusion region from heating and stretching region limits the interaction among the method steps. The closer the seal is to the coupling region, the more likely becomes the possibility that the fusing step will interfere with the stretching step or modify the taper and so degrade the coupler performance. At a distance less than about 5 mm, some degradation of coupler performance may occur. Depending upon the requirements of a particular application of the novel coupler, one may use a longer starting assembly to increase the distance between coupling region and seals and so limit degradation of coupler performance. If space is a major consideration in the particular application, then one may sacrifice some coupler performance by decreasing the coupling region to seal distance, thereby decreasing the overall size of the coupler.

Including an extra step in the process, i.e., the placement of heat shields about the heat source before a fusing step or a heat and stretch step allows the overall coupler size to be maintained small while minimizing interactions among the heating or fusing steps.

The order of the carrying out the steps also has a bearing on the amount of interaction between steps. For example, the two fusion steps wherein the seals are formed could be formed first to minimize interaction of these steps with the heating and stretching steps. In this sequence, however, care must be taken to keep residual atmospheric pressure in the interior of the tube low to prevent trapped atmospheric gas from expanding during the heating and stretching step and thus distorting the coupling region.

An alternative embodiment of the method is to form the first seal, using a heat shield to protect the waveguide fibers extending from the tube. The coupling region is then formed using a heat shield to protect the seal. Finally the second seal is made using a pair of spaced apart heat shields to protect the coupling region and the waveguide fibers extending from the other end of the tube.

A more detailed description of the invention will be made using the following drawings.

BRIEF DESCRIPTION OF THE DRAWINGS

FIG. 5 is a chart of insertion loss vs. wavelength before and after the sealing process.

DETAILED DESCRIPTION OF THE INVENTION

It will be understood that the drawings are intended to facilitate description of the invention, do not limit the invention, and, are not necessarily to scale.

Figure 1:
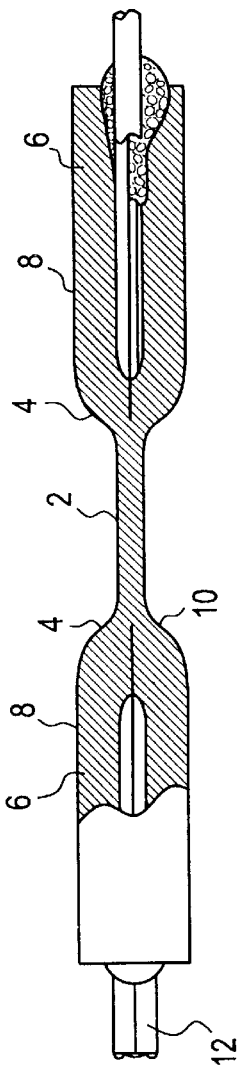
FIG. 1 is an illustration of the novel coupler.

The main features of the invention can be described with reference to FIGS. 1 & 2. In FIG. 1, the assembly of waveguides 12 and tube 6 has been heated and stretched to form the coupling region which includes the relatively straight section 2 and tapered sections 4 and 10. Note that sections 4 and 10 are mirror images of each other. The end portions of the coupler 6 each contain a seal at a position, for example, shown as 8. The airlines which are effective to improve coupler performance are those which extend from end portions 6, or in the instant case, from seals 8, to points in the tapered portions 4, at which the draw ratio $\geq 2$ (ratio of the end cross sectional area to the tapered cross sectional area is at least four). An airline also may extend continuously from an end portion 6, through straight portion 2, and into the other end portion 6. In the instant case, an airline effective to improve coupler performance could extend continuously between seals 8.

Figure 2:
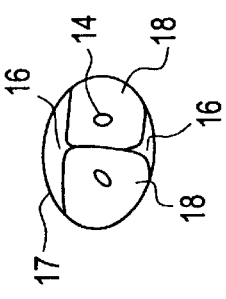
FIG. 2 is an illustration of a cross section of the novel coupler.

Examples of airlines are shown in the cross sectional view of the coupler in FIG. 2. Two waveguide fibers having clad layer 18 and core 14 are illustrated together with the inner surface of the surrounding tube 17. The radius of the tube is large compared to the waveguide fiber radius and is not shown. The assembly is shown after heating and stretching. Airlines may be formed essentially anywhere between the clad layer 18 and the inner surface of tube 17. The airlines shown as voids 16 bounded by tube 17 and clad glass layers 18 are typical. Void 16 is shown at the contact surface of the waveguides where an elongated indentation is formed. The inner surface of the tube 17 has not fused to the indented portion of the waveguides.

Figure 3:
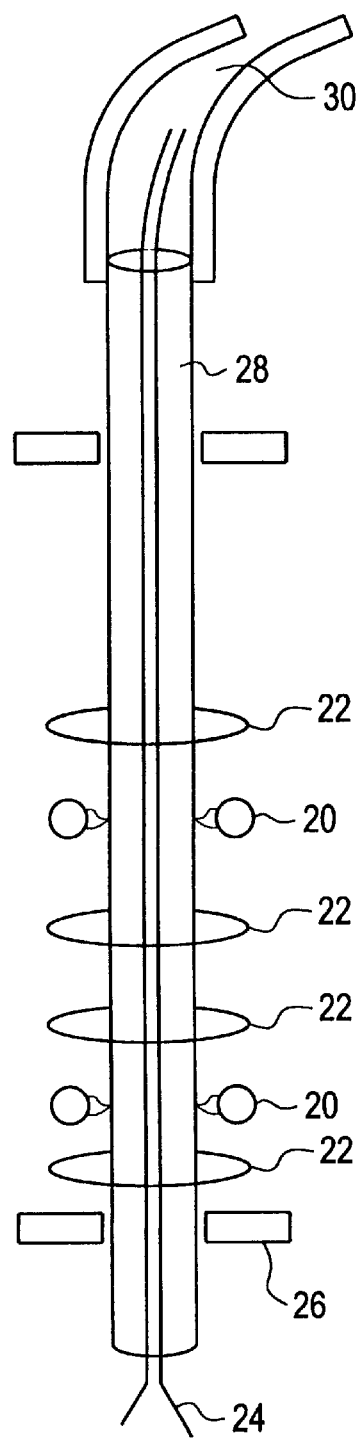
FIG. 3 is a schematic drawing of the apparatus for making the novel coupler.

An apparatus for making the novel coupler is shown in FIG. 3. The apparatus is discussed in detail in the patents noted above which are incorporated herein by reference. A pre-selected number of waveguide fibers 24 are threaded through tube 28 which is typically made of a glass, having a refractive index which may be lower than that of the waveguide clad layer. The assembly of waveguides and tube is held by one or more mechanical chucks 26. A typical means for heating the assembly, either prior to stretching or in the sealing step, is shown as ring burner 20. The burner 20 would be located substantially at the center of the assembly for the heating and stretching step wherein the coupling region is formed. Burner 20 would be located closer to an end of the assembly for forming the seals. Both positions are illustrated in FIG. 3. One or more heat shields 22 may be put in place prior to applying heat to the assembly. The purpose of the heat shields is to prevent distortion or disruption of regions of the assembly which are adjacent the region being heated. For example, during formation of a seal, a heat shield 22 between the seal and the end of the tube in FIG. 3, could be used to protect the polymer coating on the waveguide fibers 24 emerging from tube 28. A shield 22 could be placed between the seal and the coupling region during seal formation to protect the coupling region from distortion due to heating. In addition, a vacuum may be applied to the tube interior via connection 30. The use of a vacuum in the formation of the seals as well as in the formation of the coupling region assists in control of the collapse of the tubing onto the waveguide fibers.

Figure 4:
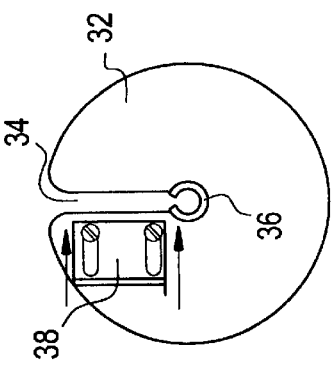
FIG. 4 is an illustration of the heat shield.

It has been found that a seal may be formed after the coupling region has been formed and without excessive distortion of the coupling region, if the location of the seal is at least 5 mm from the beginning of the tapered portion of the coupling region. In cases where the coupling region geometry must not be disturbed or distorted, a preferred spacing between a seal and the beginning of the tapered region is 7 mm. Furthermore, if both ends of the assembly are positioned in chucks and the preferred spacings between the seals and the beginning of the coupling region tapered portions is maintained, the initial length of the assembly must have a length greater than that of an assembly in which no seals are formed. The primary function of the heat shield is to maintain coupler size as small as possible while preserving the performance characteristics of the coupler. It is contemplated that the use of heat shields will provide sufficient control of the heating means to remove the sealing step as a determiner of coupler size while providing a coupler having the required performance characteristics An embodiment of a heat shield is illustrated in FIG. 4, which is a top view of a disk shaped heat shield, 32. Slot 34 is cut into the shield to allow the shield to be fitted over the tube portion of the assembly. The slot may be rounded at the center of the disk, the rounded opening denoted 36, and fitted with an o-ring type seal to allow attachment of the heat shield directly onto the tube portion of the assembly. Once the heat shield is in place, a slide 38 is moved over the slot to prevent passage of heat through the slot.

Example 1—1×4 Coupler Hhaving Seals

The results shown here for the 1×4 coupler are generally applicable to other coupler types.

Five single mode fibers were threaded through a tube 42 mm in length. Each of the five fibers had ball terminations on the ends within the tube to prevent stray light scattering from the fiber ends. The incorporation of two dummy fibers provided a "six around one" configuration within the tube. The assembly was chucked at both ends. A first seal was formed in an end portion of the assembly using a ring burner having a methane flow of 0.45 slpm and an oxygen flow of 0.90 slpm. The pressure inside the assembly was about 380 mm of Hg. The flame was applied to the assembly for about 16.5 seconds. The coupling region was formed next using the same ring burner and gas-oxygen flows and vacuum level. To form the coupling region, the ring burner was moved 7 mm from the position at which the seal was formed. The second seal was formed using the same procedure as for the first seal. The ring burner was positioned 7 mm from the beginning of the tapered portion of the coupling region. To accommodate the spacing recited above, the assembly was 10 mm longer than the standard assembly for making a coupler without seals.

Figure 6:
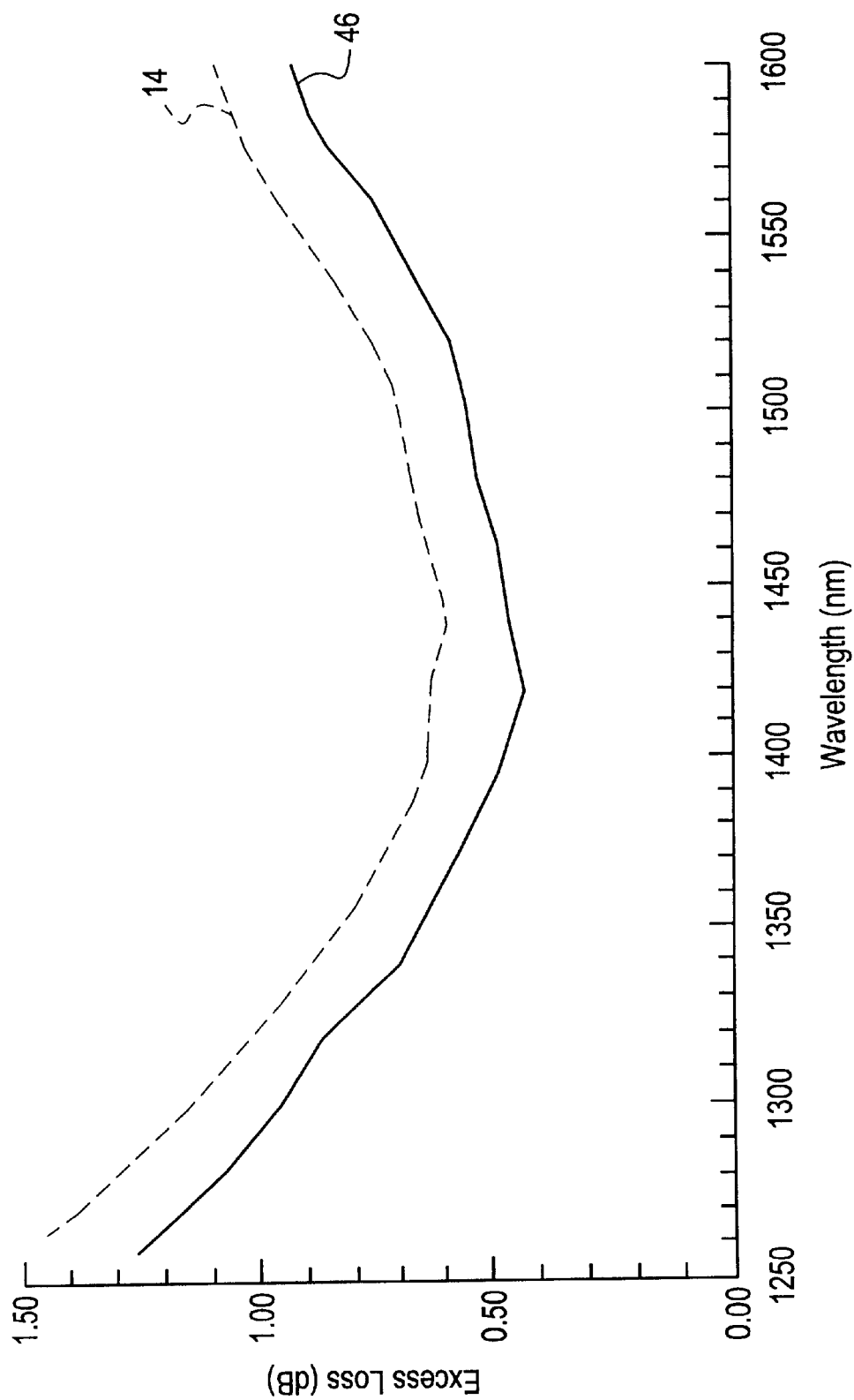
FIG. 6 is a chart of excess loss vs. wavelength before and after the sealing process.

FIG. 5 shows the insertion loss over a band of wavelengths for each of the four output fibers before the final seal is formed, curves 42, and after formation of the final seal, curves 40. The uniformity of the coupler is adversely effected as can be seen by the greater spread among curves 40. However, the insertion loss is only slightly increased. The excess loss over the wavelength band is shown in FIG. 6 before, curve 46, and after, curve 44, formation of the final seal. The increase of only 0.1 dB is an excellent result. The coupler of this example would serve as a replacement coupler for a standard coupler, having no seals, in most applications.

Comparative Example 2—Use of a Heat Shield

A method contemplated for making the coupler of Example 1 is as follows.

A coupler is made in accordance with the method of Example 1 except that a standard length tube (32 mm as compared to the 42 mm of Example 1) is used. Before each seal is formed, the chuck nearest the seal point is released and moved away from the assembly. A heat shield is placed between the ring burner and the ends of the waveguide fibers emerging from the tube to protect the polymer coating.

The standard length of the coupler is maintained and performance comparable to Example 1 is expected.

Comparative Example 3—1×4 Coupler Using a Longer Assembly

A 1×4 coupler was made in accordance with the method of Example 1 except that the starting assembly was 23 mm longer than standard (13 mm longer than that of Example 1).

Figure 7:
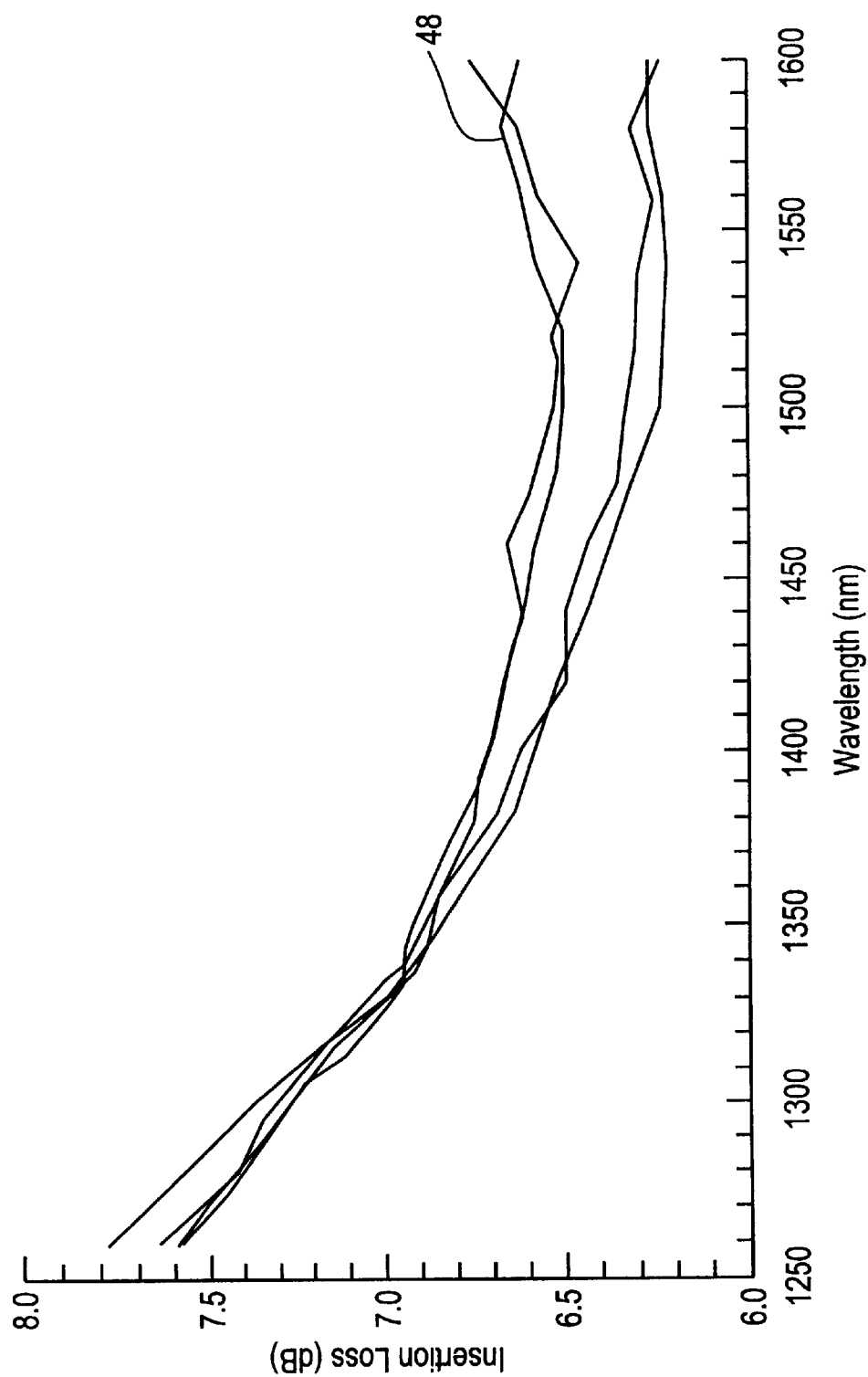
FIG. 7 is a chart of insertion loss vs. wavelength before and after the sealing process in an embodiment wherein a glass tube 23 mm longer than the standard tube (for a coupler with no seals) is used.

Insertion loss vs. wavelength for this coupler is shown in FIG. 7. The controlling parameters of the stretching step were not optimized for flat insertion loss over the wavelength band of interest as can be noted from curves 48 at the lower end of the wavelength band. This is easily adjusted and is not material to the example.

Test results showed that coupler insertion loss and wavelength band uniformity were within 0.1 dB of those typical of an unsealed 1×4 coupler.

This example illustrates the importance of controlling the heated area of the assembly during each of the sealing steps and the stretching step. The example reinforces the contemplated importance of the heat shield.

Although various embodiments of the invention have hereinbefore been disclosed and described the invention is nonetheless limited only by the following claims.

We claim:

1. An optical waveguide fiber coupler comprising:

at least two waveguide fibers each having a length, a first and a second end, and a surface clad glass layer, the respective clad glass layers fused to each other along a portion of the waveguide lengths spaced apart from the waveguide fiber ends, a portion of the fused length forming a coupling region, having a surface, the respective first and second ends of the waveguide fibers being input and output ports for transmitting light into and out of said coupling region;

an elongated tubular element, having an inside surface, and a first and a second end, surrounding and extending over at least said coupling region;

said optical waveguide fiber coupler having at least one elongated open region bounded by a portion of said inside surface of said tubular element, a portion of said surface clad layer, and at least a portion of the surface of said coupling region;

wherein the elongated open region has a first and a second end and at least one end of the elongated open region is terminated within said elongated tubular element by at least one leak tight seal.

2. The optical waveguide coupler of claim 1 wherein said seal is a fusion among the surfaces which bound the elongated open region.

3. The optical waveguide coupler of claim 1 wherein said elongated tubular element comprises a glass.

4. The optical waveguide coupler of claim 3 wherein said tubular element and said clad glass layer have respective refractive indices and the refractive index of said tubular element is less than or equal to that of said clad glass layer.

5. The optical waveguide coupler of claim 1 wherein said waveguide coupler has a first and a second end segment and said coupling region includes a central portion having a cross sectional area $A_c$ and a first and a second end, and a tapered portion at the respective ends of said central portion, said tapered portions joining said central portion of said coupling region to respective end segments of said optical waveguide coupler, each end segment being located within said elongated tubular element and having cross sectional area $A_e$, and said tapered portions having a cross sectional area which tapers from $A_e$ to $A_c$, the tapered cross sectional area being $A_{ti}$ at a point i along the tapered portion, wherein, the elongated open region is sealed at a location in at least one of said waveguide coupler end segments and extends from the sealed location in said at least one end portion into the nearest tapered portion to a location in the tapered portion where the ratio $A_e/A_{ti} \geq 4$.

6. The optical waveguide coupler of claim 5 wherein an elongated open region extends continuously from said first waveguide coupler end segment, through the tapered and central portions of said coupling region, into said second waveguide coupler end segment, the elongated open region being sealed at respective locations in said first and second waveguide coupler end segments.

7. The optical waveguide coupler of either one of claim 5 or 6 wherein the separation between the location of a seal of an elongated open region and the beginning of the nearest tapered portion is not less than about 5 mm.

8. A method of making an optical waveguide fiber coupler comprising the steps:

a) threading at least two waveguide fibers through an elongated tubular element, each said waveguide fiber having a surface clad glass layer and first and second ends, and said tubular element having an inner surface and a first and a second end, to form an assembly wherein the respective waveguide fiber ends extend from the corresponding ends of the tubular element;

b) fusing the clad glass layer surfaces to each other and to said tubular element inner surface so that said surfaces form a first seal in a portion of said tubular element near the first end thereof;

c) fusing the clad glass layer surfaces to each other and to said tubular element inner surface so that said surfaces form a second seal in a portion of said tubular element near the second end thereof;

d) at a location between the first and second seals, heating and stretching said assembly to form a coupling region, wherein said coupling region has a surface and includes a central portion having a cross sectional area $A_c$ and a first and a second end, and a tapered portion at the respective ends of said central portion, said tapered portions joining said central portion of said coupling region to respective end segments of said optical waveguide coupler, each end segment located within the length of said elongated tubular element and having cross sectional area $A_e$, and containing a seal, said tapered portions having a cross sectional area which tapers from $A_e$ to $A_c$, the tapered cross sectional area being $A_{ti}$ at a point i along the tapered portion;

wherein, during said heating and stretching step, the heating rate and the stretching rate are preselected to provide at least one elongated open region in said coupler, the elongated open region having boundaries defined by a portion of the inside surface of said tubular element, a portion of the surface of said coupling region, and a portion of the surface clad glass layers of said waveguide fibers, and said at least one elongated open region extends from one of the seals to a point in said tapered length at which the ratio $A_e/A_{ti} \geq 4$.

9. The method of claim 8 wherein said heating and stretching step includes:

use of a methane ring burner having a methane flow of 0.45 standard liters/minute and an oxygen flow of 0.90 standard liters/minute; and, a stretching speed of about 1 cm/minute;

said heating and stretching being done while the interior pressure of the assembly is about 380 Torr;

thereby providing at least one elongated open region in said waveguide fiber coupler.

10. The method of claim 8 wherein said elongated open region extends from the first seal, through said coupling region, to the second seal.

11. The method of claim 8 wherein the location of each seal is spaced apart from the nearest tapered length by a length no less than 5 mm.

12. The method of claim 8 wherein said heating and stretching step d) is carried out before either said fusing step b) or c).

13. The method of claim 8 wherein said heating and stretching step d) is carried out after one of said fusing steps b) or c).

14. The method of claim 8 further comprising the step:

prior to any of steps b), c), or d), wherein said steps are carried out using a heat source, positioning at least one heat shield spaced apart from said heat source, to isolate at least a portion of said waveguide coupler from the heat source.

15. The method claim 14 wherein said heat source is positioned between two heat shields.

16. The method of claim 14 wherein said at least one heat shield is positioned between the heat source and the nearest end of said tubular element.

17. The method of claim 14 wherein said heat shield is a substantially flattened disk having a thickness and a surface, a slot shaped opening being formed through the thickness of said disk and extending from an interior location on the disk surface through the periphery of the disk, to allow said heat shield to be positioned about said assembly, the assembly disposed substantially perpendicular to the heat shield surface, said heat shield further comprising a slide movably mounted on the surface of said heat shield, to cover the slot shaped opening after said shield is positioned about the assembly.

* * * * *